Oct. 27, 1964      T. W. RUSSELL      3,154,161
TORSION BALANCE
Filed March 1, 1963

INVENTOR.
THOMAS W. RUSSELL
BY
ATTORNEYS

3,154,161
TORSION BALANCE
Thomas W. Russell, 445 S. 41st St., Boulder, Colo.
Filed Mar. 1, 1963, Ser. No. 262,171
14 Claims. (Cl. 177—196)

This invention relates to laboratory balance and, more specifically, to a novel type of torsion balance that employs a twistable quartz fiber as the means by which a null reading is attained.

Balances of various types have been in use for hundreds of years to make delicate weight determinations in the scientific laboratory. The more common types are, of course, the double-pan and beam balances, both of which employ knife-edged fulcrums. These units are relatively rugged and have the advantage of being useable over a relatively wide range; however, they lack the sensitivity so necessary in extremely delicate weight measurement applications. Accordingly, while these instruments will continue to occupy an extremely significant place in the art, they have definite sensitivity limits which render them unsuitable for many precision measurements that are occurring with increasing frequency in the present day scientific community.

Needless to say, the need for ever-increasing sensitivity has brought forth many worthwhile attempts to improve upon these more-or-less basic types of balances, some of which involve merely the addition of systems by which the operator may read them more accurately. Others constitute nothing more than the utilization of up-to-date precision manufacturing techniques in the fabrication of the various components of the balance thereby effecting substantial increase in over-all sensitivity. Still others attack the problem from a different angle, namely, the elimination of some of the factors which limit the sensitivity of a given design such as, for example, the friction between the beam and its knife-edge fulcrum, the effect of thermal expansion on the various components, and the non-linearity inherent in most read-out systems, especially those covering a relatively wide range. Finally, a few attempts have been made in recent years to approach the problem of extreme sensitivity in a weighing device from a different angle than attempting to improve on the traditional designs. It is the latter approach that has been taken in connection with the instant invention and which holds promise of resulting in the more significant advance. Even the latter approach, however, must call into play some of the underlying principles of differential measurement and the like which are inherent in any balance.

Accordingly, rather than enter into a detailed discussion of the prior art balance mechanisms and attempt to point out their deficiencies insofar as extremely precise weight measurements are concerned, it would, perhaps, be more beneficial to consider instead the characteristics that should be present in an ideal balance and relate these theoretical requirements to the present structure so as to determine, where possible, how closely the design has come to achieving these empirical ends.

The first, and certainly one of the most important considerations is that of friction. While in a sense, this factor can never be eliminated in its entirety, the indeterminate effects thereof such as wear, etc. can be minimized and their influence on the ultimate reading may become negligible. This, however, can never be the case when beams must rock on fulcrums.

Next, the problem of temperature and humidity on the several components of the system causing unequal expansion and contraction must be considered. This is best overcome by fabricating the entire operative system from a single material so that, while these effects are still present, they act to a like degree in the whole assembly thereby cancelling out such errors as they might otherwise introduce.

Obviously, another very important consideration is that of inaccurate read-out over the entire range of the instrument. The latter is very difficult to achieve and many complex factors enter into a determination of just how accurate a given reading may be, not the least of which is the skill of the operator. For this reason alone, nearly all accurate measuring instruments employ the technique of attempting to balance an unknown load against a known one rather than attempting to use the "scale" principle in which the weight of an unknown is translated directly to a reading, the latter approach being one that is fraught with numerous and essentially insolvable non-linearity problems. Even the balancing technique ordinarily calls into play a compromise wherein the indicator never is allowed to null itself but rather the "swings" from one side to the other past the null point are averaged to give a reading. The human errors inherent in such systems are obvious. The solution to this difficulty lies, or course, in the provision of a read-out system which is linear throughout the full range of the balance, uses an "absolute null" rather than a calculated one, and preferably eliminates the human factor.

Last but not least, the ideal balance should be simple. By the term "simple" is meant both the use of the instrument and its construction. In connection with the latter, it is often the case that the designer incorporates system on top of system to compensate for errors he knows exist rather than attacking the crux of the problem, namely, the elimination of the error-producing structure itself. The usual result is merely to compound the problem through the creation of counteracting forces whose interrelationship is so complex as to become incapable of precise determination.

While the foregoing by no means constitute all the design criteria that must be considered in arriving at a structure that will approach the ideal balance, they are certainly some of the more significant ones. Furthermore, by finding satisfactory solutions to these problems the resulting structure will be a great deal better than that heretofore available even though by virtue of its increased sensitivity, factors of lesser importance become significant.

The balance forming the subject matter of the instant invention, on the other hand, achieves most, if not all, of the aforementioned desirable objective. To begin with, it is fabricated in its entirety from a single material, preferably fused quartz, which is the best substance currently available from the standpoint of possessing no measurable hysteresis. Instead of employing a system of added known weights to balance the unknown which system, of necessity, is dependant upon the accuracy of the counterbalance, the instant system permits the unbalanced condition to exist and then counteracts same with an equal and oppositely-action torsional force component introduced through a linear torsion filament. Thus, rather than attempting to measure a counterbalancing weight system it is only necessary to read the restoring force applied to a torsion fiber that is required to return the unbalanced rocker-arm assembly to an absolute null position. In the preferred embodiment of the invention, the read-out is accomplished by means of an inertialess light beam impinging upon a splitting prism that is self-nulled photoelectrically to eliminate human error. A specially designed torsion assembly reduces the effect of any tensional force components introduced into the torsion filament by reason of the latter being twisted to a magnitude which is insignificant.

It is, therefore, the principal object of the present invention to provide a novel laboratory balance utilizing a torsional counterbalance theory that results in greatly increased sensitivity.

A second objective of the invention herein disclosed is the provision of a weighing apparatus that is so designed as to substantially eliminate any errors due to frictional forces.

Another object is to provide a precision balance which effectively lengthens the read-out scale to a point where much greater accuracy is attained while, at the same time, making the unit more compact than those prior art devices of lesser sensitivity.

Still another objective of the invention herein disclosed and claimed is the provision of a balance that eliminates the need for correctional devices to overcome the deficiencies in the basic system because the basic system itself is relatively free from measurable error.

An additional object is to provide a laboratory balance that is exceedingly simple when considered in the light of its capabilities as compared with known mechanisms of lesser accuracy.

Further objectives are the provision of a precision balance that is easy to use, relatively rugged, versatile, dependable, predictable, capable of producing excellent results even in the hands of unskilled operators, and one whose basic design criteria are applicable to a wide variety of diverse weighing applications.

Other objects will be in part apparent and in part pointed out specifically hereinafter in connection with the description of the drawings that follows and in which.

Figure 1:
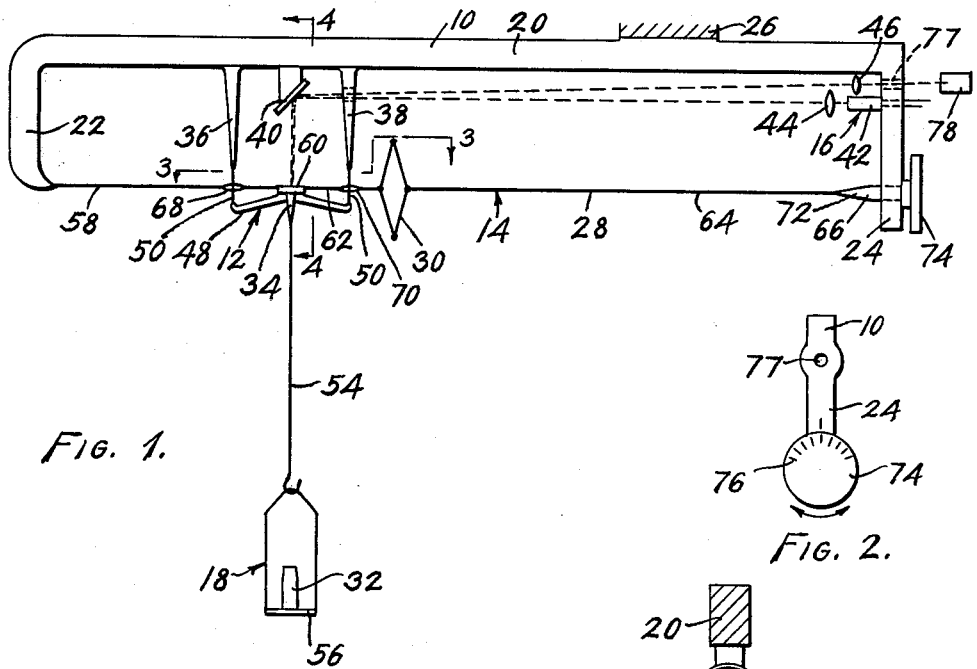
FIGURE 1 is a side elevation showing the torsion balance of the present invention.

Referring now to the drawings for a detailed description of the present invention and, to initially, to FIGURE 1 for this purpose, the balance will be seen to include several integrated systems, among which are the supporting frame 10, the beam assembly 12, the torsion assembly 14, the read-out system 16 and the pan 18, the selected reference characters having been employed to designate these subassemblies more or less broadly. First, with respect to the supporting frame 10, it comprises an elongate rigid quartz bar 20 having downturned end portions 22 and 24 between which the torsion assembly 14 is stretched. Bar 20, in the particular form shown, is attached intermediate its ends to the underside of a fixed support 26 that may constitute a portion of a case or some such closure that will protect and more or less isolate the functional components from the action of air currents, extremes in temperature and humidity. In that the case form no functional part of the present invention and can be constructed in many different ways already known to those skilled in the art so as to accomplish that one end, it has not been illustrated. The case need not be fabricated from quartz and, insofar as the present invention is concerned, it functions merely as a fixed support for frame 10. The interrelation between bar 20 and fixed support 26 must, however, be such that the latter introduces no deforming stresses of a magnitude capable of twisting, deflecting or otherwise effecting the shape of the bar and its associated elements included within the supporting frame 10 as such forces would introduce errors in the read-out system 16. A connection such as that shown at 26 has proven entirely satisfactory.

Bar 20 must not bend nor can its downturned ends 22 and 24 move closer together under the influence of the tension existing in torsion fiber 28 by reason of tension spring 30. In other words, parallelogram-type leaf spring 30 determines the ultimate tension in torsion fiber 28 stretched between the downturned ends of the supporting frame and, said frame must be fabricated from a piece of quartz heavy enough to resist this tension without measurable deflection. The reason for this is, as will be shown presently, the tension in the torsion fiber 28 must remain substantially constant if the torsional force component introduced therein to restore the read-out system to its null position is to be an accurate measure of the distorting force applied to the beam assembly 12 by the unknown load 32 suspended from one end of the rocker arm 34. Here again, the problem sounds more significant than it actually is because the torsion fiber will break long before it or spring 30 can pull the downturned ends of bar 20 together a detachable amount more than they are already deflected by the pre-load tension in said spring.

Intermediate the ends of bar 20 a pair of tapered posts 36 and 38 are fused in fixed spaced substantially parallel relation to one another and to the downturned ends 22 and 24. These posts support the beam assembly 12 for rockable movement therebetween and are also essentially rigid in that they will not undergo appreciable deflection as the beam assembly tilts back and forth. Here, however, some deflection can be tolerated without introducing errors in the final reading because the deflecting forces are counteracted and thereby nullified by the torsion assembly before a reading is taken as will appear presently.

Supporting frame 10 also carries several elements of the read-out system 16 including, as shown, mirror 40, light source 42 and lenses 44 and 46. These elements should be mounted on the same support structure as the torsion assembly and beam assembly with which they cooperate to produce a reading; otherwise, if mounted on some external structure independent of support frame 10, relative movement could take place between these two structures which would introduce errors into the reading.

Figure 3:
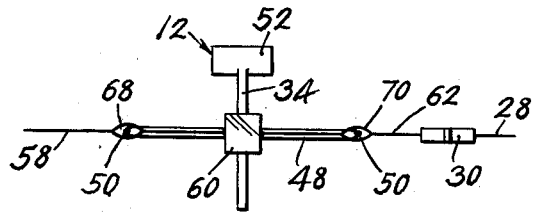
FIGURE 3 is a section taken along line 3—3 of FIGURE 1 to an enlarged scale showing the counter-weighted beam and associated torsion filament.
Figure 4:
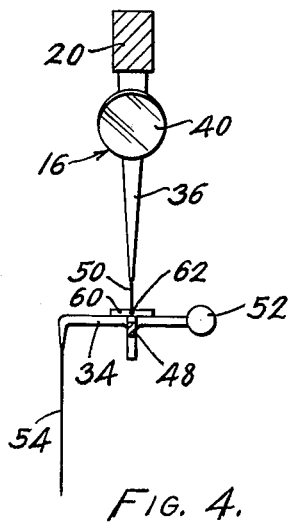
FIGURE 4 is a vertical section, also enlarged, taken along line 4—4 of FIGURE 1 showing further details of the counter-weighted beam.

Next, with reference to FIGURES 1, 3 and 4, the beam assembly 12 will be described in detail. A quartz cross-arm 48 has the opposite extremities thereof attached to the lower ends of posts 36 and 38 of the supporting frame 10 by thin bendable quartz filaments 50 that allow said cross-arm to twist through a limited degree of angular rotation relative to said support. Intersecting this cross-arm 48 at right angles thereto and substantially midway between its ends is the rocker arm 34, these elements both being fabricated from quartz and fused together to form unitary rockable assembly. One extremity of the rocker arm carries a counterweight 52 which, in the particular form shown, is permanently attached although it could be made removable and, therefore, interchangeable with other counterweights of different size. As illustrated, the counterweight is also quartz and fused to the end of the rocker arm.

The other extremity of the rocker arm is downturned and formed to provide a hook 54 from which a weighing pan 56 is suspended that carries the unknown weight 32. It is, of course, obvious that many other arrangements could be employed as a means for supporting an unknown weight suspended from one end of the rocker arm. The counterweight is so selected that it counterbalances the weight of the pan 56 and such other portions of the rocker arm and hook as lie on the opposite side of the cross-arm leaving said rocker arm in a horizontal position corresponding to the "null" point of the read-out system. The addition of any extraneous weight such as 32 to the pan will obviously cause the rocker arm to tilt in a direction to lower the pan as the cross-arm turns and bends connecting filaments 50. Note that when these fibers or filaments 50 bend, they do so without any sliding friction found in all knife-edged fulcrums. This is not to say, however, that the force required to bend the filaments 50 through varying degrees of angular deflection is linear or even predictable although, as will be explained presently, this factor is of no importance because the reading is taken exclusively from the linear torsion force produced in torsion fiber 28 that restores the beam assembly to its null position. It should, perhaps, be pointed out in this connection that the angular deflection of the beam assembly 12 induced by the weight is of no significance and, in fact, a stop or support can be placed under the pan to limit its total excursion to a fraction of an inch without effecting the readout or operation of the balance in any way. Furthermore, the cross-arm should not be allowed to travel so far as to assume or even closely approach a vertical position because of the possibility of breaking or otherwise damaging some of the delicate quartz fibers in the torsion and beam assemblies.

Now, with reference to the first four figures of the drawing, it will be seen that the torsion assembly includes a torsion fiber 28 stretched between the downturned ends 22 and 24 of the supporting frame and connected to the beam assembly 12 located therebetween. Actually, torsion fiber 28 has several sections, the first of these, 58, having one end attached to downturned end 22 of the support assembly and the other end connected to an edge of mirror 60 that is attached to the beam assembly 12 at the intersection of the cross-arm and rocker arm for movement conjointly therewith. The second section or segment 62 of the torsion fiber 28 extends from the opposite edge of mirror 62 to one corner of parallelogram-type leaf spring 30. The third and last section 64 extends from the opposite corner of the leaf spring to its point of attachment with the inner extremity of torsion fiber actuator 66 that is journalled for rotation within the downturned leg 24 of the supporting frame. Segments 58 and 62 even contain loops 68 and 70 located intermediate the ends thereof that pass filaments 50 of the beam assembly 12 without touching same.

Spring 30 is extremely significant to the successful operation of the balance because it reduces any errors introduced into the system because of foreshortening of the torsion filament when it is twisted, slack occasioned by movement of the downturned ends of the frame toward one another, and variances in filament tension caused by the rotatable mounting of actuator 66 to those of a second or third order of magnitude. In other words, without spring 30, any variations in the tension in filament 28 would be reflected directly into the read-out system as errors of a first order of magnitude. Assume, for example, that the beam assembly has been deflected by the presence of a weight 32 on pan 56 when, for some reason, the tension in the torsion filament is lessened. This lessening of the tension requires additional torsional deflection to be impressed upon the filament 28 in the opposite direction before the null point is once again achieved and this additional twist will be reflected as an increase in the weight of load 32. In other words, the system is incapable of distinguishing between torsional deflection caused by the load and from other extraneous factors and, therefore, it reads them all the same. Conversely, if the fiber 28 increases in tension, it will tend to untwist thereby lessening the restoring torque required to counteract same resulting in the load being indicated lighter than it actually is.

With spring 30 in the system, on the other hand, these problems become negligible. It should be mentioned that due to the construction of the supporting frame, any change in tension in the filament 28 due to deflection in the beam and the like is already negligible; however, this is not true of the mounting for actuator 66 and the major source of error would certainly be the shortening of the filament that results when it is twisted. Spring 30, however, is so designed that it will flex and maintain a substantially constant tension throughout the entire length of torsion fiber 28. Note in this connection that the maximum foreshortening of fiber 28 is probably in the neighborhood of a hundredth of an inch or so and the tension developed by spring 30 will, therefore, not vary any detectable amount over this range. Spring 30 is, furthermore, designed to transmit torque between segments 62 and 64 of fiber 28 without the legs thereof becoming skewed. In other words, by constructing the parallelogram-shaped spring from considerably heavier pieces of quartz than that from which the torsion fiber is fabricated, the spring will remain planar despite the torsional forces applied thereto that tend to twist same.

Figure 2:
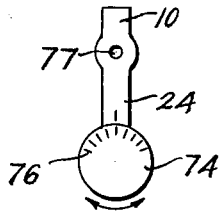
FIGURE 2 is an end view thereof showing the control by which the torsion fiber or filament is twisted to counteract the unbalanced condition produced by the unknown load.

Actuator 66, as shown, comprises nothing more than an axial spindle 72 journalled for rotation within a suitable opening in downturned portion 24 of the supporting frame, and an externally-located knob 74 on the end of said spindle. The actuator provides means by which the torsion filament 28 is twisted to counteract the unbalanced condition of the beam assembly caused by load 32. The torque loading of torsion fiber 28 is, for all practical purposes, completely linear; hence, the read-out scale 76 on knob 74 (FIGURE 2) can have equal graduations. The significant point, however, is the number of turns and partial turns of knob 74 that are a direct indication of the weight of load 32 and the scale may be calibrated with known loads to read directly in terms of weights.

Two different types of read-out systems have been illustrated herein, the first of these in FIGURES 1–4, inclusive, to which reference will now be made. Mirror 60 mounted on the beam assembly 12 for rockable movement therewith receives from light source 42 an essentially point source image of a lamp filament (not shown) that is formed thereon by means of lens 44 arranged to intercept same and mirror 40 which receives the horizontal beam and reflects same more or less vertically onto mirror 60. When the beam assembly is deflected due to the presence of a load, mirror 60 will be tilted so that the beam will not pass through lens 46 located in front of aperture 77 above the light source when rereflected by mirror 40. As the torsion fiber is used to return the beam assembly to its original "null" or unloaded position, on the other hand, the light beam will once again become centered in aperture 77 at which point the reading is taken to determine the weight of the unknown load. Obviously, the beam of light will spread somewhat as it is reflected to-and-fro off of the silvered mirror surfaces making accurate reproducable readings difficult. Accordingly, supplementary read-out mechanisms should be provided that are capable of locating the position of the mirror with the desired degree of accuracy. A number of devices are available for this purpose which form no part of the present invention and, therefore, have been broadly identified in FIGURE 1 with the numeral 78. One example of such a read-out mechanism ideally suited for this purpose will be found in U. S. Patent 3,067,617 wherein a splitting prism is employed to intercept the light beam and divide same into two different beams that are reflected into a pair of photo-cells. These cells are responsive to the quantum of light impinging thereon and function to deflect a galvanometer needle in proportion to the current generated in each. Thus, when both photo-cells are receiving exactly the same amount of light signifying the beam has been split in half, the current generated by these units will be equal and opposed to one another as evidenced by no deflection of the galvanometer needle. Such a read-out mechanism could be used to establish the original "null" or indexed position of the balance that corresponds to the unloaded condition and, subsequently, to indicate that this reference position had once again been achieved after the load was added and the torsion assembly employed to counterbalance same.

Figure 5:
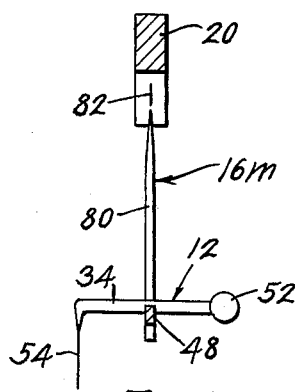
FIGURE 5 is a vertical section similar to FIGURE 4 showing a slightly modified form of the invention utilizing a pointer as the null indicator instead of a reflected light beam.

A simpler, and admittedly somewhat less accurate, read-out system 16m has been shown in FIGURE 5. Here, mirror 60 has been replaced by a needle-type indica 80 that moves with the beam assembly 12 and sweeps across on index mark 82 on the supporting frame that replaces mirror 40.

Regardless of which read-out system is used, the procedure remains the same. The balance is indexed without the load to locate a null point on scale 76 with reference to which subsequent readings are calculated. When the load is added to pan 56, the beam assembly 12 will tilt placing a slight twist in the torsion fiber corresponding to the degree of angular deflection through which rocker arm 34 is allowed to move. At the same time, the indicator, whether it be the needle or a light beam, will move off of the reference point. Next, the torsion filament will be twisted through the number of turns and partial turns necessary to return the beam assembly to its reference position previously determined. The difference between the final indication on the scale and the reference position thus becomes a direct indication of the unknown weight.

Certain other aspects of the above system should be examined because they are not obvious and could be overlooked. To begin with, segments 58 and 62 of the torsion filament twist, at most, through an angle of less than 90°. This is not the case, however, with segment 64 which is considerably larger and may require several 360° turns to produce the necessary torque required to counterbalance the load. In other words, most of the twist will occur in segment 64. This is a decided advantage in terms of scale amplification because, if we assume knob 74 has a diameter of only one inch and the maximum operating range of the instrument allows ten complete turns of the knob to restore the balanced condition, we have an effective scale length of over thirty inches which enables extremely accurate readings to be made.

A careful analysis of the above described structure might lead one to assume certain difficulties would arise in connection with filament-enveloping loops 68 and 70 of the torsion filament. First of all, it might appear that when tension was applied to the filament as it is twisted, these loops would close upon hanger filaments 50. This, however, does not occur because, once again, the spring 30 maintains a constant tension in segments 58 and 60 and the loops therein are fabricated from quartz of sufficient stiffness to resist elongation to the point of closing when so tensioned.

Secondly, it makes no difference whether filaments 58 of the beam assembly contact the loops 68 and 70 of the torsion fiber when the rocker arm is tilted under load because no readings are taken while this condition subsists. Then, when the system is returned to its indexed position, the loops once again move out of contact with fibers 50 enabling an accurate reading to be taken. Admittedly, the torsional force component applied to the torsion filament 28 will result in segments 58 and 62 turning back past their unloaded initial position and, conceivably, they could contact the filaments 50; however, under most conditions, the angle of twist in the short sections 80 of segments 58 and 62 lying between the loops and their points of attachment to the edges of the mirror 60 is so small in relation to the total number of turns applied over the full length of the filament as to cause no difficulty. Even if this should prove to be a problem, it can be solved very easily by making segment 64 of higher gage quartz than either segment 58 or 62. By so doing, the segments 58 and 62 will resist the torsional force applied to the torsion filament to a greater extent than segment 62 and the total restoring force will be distributed along the filament 28 in such a way that several turns are placed in segment 64 for each fraction of a turn resulting in the remaining segments.

Having thus described the several useful and novel features of the torsion balance of the present invention, it will be apparent that the many worthwhile objectives for which it was developed have been achieved. Although but two slightly different embodiments of the balance have been illustrated herein, I realize that certain other changes and modifications may well occur to those skilled in the art within the broad teaching hereof; hence, it is my intention that the scope of protection afforded hereby shall be limited only insofar as said limitations are expressly set forth in the appended claims.

What is claimed is:

1. In a balance, a supporting frame including a pair of horizontally spaced downwardly projecting abutments interconnected by a rigid bridge element spacing the distance therebetween, a pair of bendable hinge-forming filaments hanging from the bridge element in spaced relation to one another aligned between the abutments, tiltable beam-forming means suspended from the free ends of the hinge-forming filaments for rockable movement about a substantially horizontal axis that intersects the frame abutments, load-carrying means suspended from a point in the beam means displaced to one side of the axis of rockable movement of the latter, counterweight means carried by the beam means positioned and adapted to counterbalance the load-carrying means, torsion means operatively connected to the beam means and adapted upon actuation to return same to balanced position from a condition of unbalance caused by the addition of a load to the load-carrying means, said torsion means including an actuator journalled within one of the frame abutments for rotation about an axis coincident with the axis of rockable movement of the beam means, a twistable torsion filament extending along the axis of rockable movement of the beam means with one end connected to the actuator and the opposite end attached to the other of said frame abutments, said torsion filament being attached intermediate its ends to the beam means independent of the hinge-forming filaments supporting same, and leaf spring means attached to the torsion filament adapted to pre-load same with a substantially constant tension throughout the entire range of torsional deflection of the latter without otherwise responding to said torsional forces, and read-out means operatively associated with the beam means responsive to the torque induced in the torsion means as a measure of the counterbalancing force necessary to restore said beam means to a balanced position following deflection thereof through the addition of a load to the load-carrying means, said read-out means including means for indexing the beam means and actuator to locate the relative positions thereof before a load is added, and scale means calibrated in units of weight adapted to indicate the degree of angular rotation of the actuator necessary to restore the beam means to balanced position when loaded.

2. The balance as set forth in claim 1 in which the leaf spring means comprises a pair of oppositely bowed spring elements joined together at their opposite extremities to form a closed loop.

3. The balance as set forth in claim 1 in which the leaf spring means in connected intermediate the ends of the torsion filament.

4. The balance as set forth in claim 1 in which the leaf spring means is connected into the torsion filament between the actuator and beam means.

5. The balance as set forth in claim 1 in which closed loops are formed in the torsion filament positioned and adapted to receive the hinge-forming fibers without contacting same when the beam means is in balanced position.

6. The balance as set forth in claim 1 in which the leaf spring means is positioned between the beam means and the actuator thus dividing the torsion means into two segments, and in which the segment of the torsion filament containing the leaf spring means is thinner than the remaining segment so that a substantially greater portion of the twist imparted to said torsion filament by the actuator is imparted to said spring-containing segment.

7. The balance as set forth in claim 1 in which the load-carrying means comprising a detachable pan suspended from the beam means.

8. The balance as set forth in claim 1 in which the beam means includes a substantially horizontal cross arm having its opposite ends connected to the hinge-forming filaments, and a rocker arm secured to the cross arm intermediate its ends in substantially normal relation thereto.

9. The balance as set forth in claim 1 in which the indexing means comprises, a mirror attached to the beam means for rockable movement therewith about the latter's axis, a stationary light source adapted to generate a narrow beam, a stationary mirror positioned to intercept the beam of light from the source thereof and reflect same onto the movable mirror, and null-indicating means located to intercept the light beam reflected from the surface of the movable mirror when the beam means is in balanced position.

10. The balance as set forth in claim 1 in which the indexing means comprises a pointed secured to the beam means for rockable movement therewith and a fixed reference point to which said pointer returns whenever the beam means occupies a balanced position.

11. The balance as set forth in claim 1 in which the supporting frame, beam means and torsion means are all fabricated from fused quartz.

12. The balance as set forth in claim 1 in which the beam means is suspended nearest to the end of the torsion filament attached directly to the abutment, the leaf spring means is located between the actuator and the beam means adjacent the latter thereby dividing the torsion filament into two segments of unequal length, and in which the torsion filament segment containing said spring means is the longer having a relatively long uninterrupted section extending from the actuator adapted to receive the majority of the torque necessary to restore the beam means to balanced position.

13. The balance as set forth in claim 2 in which each leg of the spring means includes a pair of angularly disposed relatively straight sections, said sections cooperating with said legs attached in assembled relation to form a substantially parallelogram-shaped closed loop that is essentially planar and adapted to transmit torque without becoming non-planar.

14. The balance as set forth in claim 5 in which the hinge-filament-enveloping loops in the torsion filament are adapted to remain open and out of contact with said hinge-forming filaments under the influence of the preload tension applied constantly thereto by the leaf spring means.

References Cited in the file of this patent
UNITED STATES PATENTS

| | | |
|---|---|---|
| 2,124,968 | Ahrndt et al. | July 26, 1938 |
| 2,185,582 | Blau | Jan. 2, 1940 |
| 2,417,392 | Craig et al. | Mar. 11, 1947 |
| 2,624,564 | Carmichael | Jan. 6, 1953 |
| 3,017,940 | Baltac | Jan. 30, 1962 |